United States Patent
Hayes, Jr.

(10) Patent No.: US 9,545,750 B2
(45) Date of Patent: Jan. 17, 2017

(54) PORTABLE TUBE FLARING SYSTEM FOR FLEXIBLE TUBING

(71) Applicant: Frank F. Hayes, Jr., Costa Mesa, CA (US)

(72) Inventor: Frank F. Hayes, Jr., Costa Mesa, CA (US)

(73) Assignee: Fit-Line, Inc., Santa Ana, CA (US)

( * ) Notice: Subject to any disclaimer, the term of this patent is extended or adjusted under 35 U.S.C. 154(b) by 211 days.

(21) Appl. No.: 14/325,118

(22) Filed: Jul. 7, 2014

(65) Prior Publication Data

US 2015/0017276 A1 Jan. 15, 2015

Related U.S. Application Data

(60) Provisional application No. 61/843,555, filed on Jul. 8, 2013.

(51) Int. Cl.
*B29C 57/02* (2006.01)
*B29B 13/02* (2006.01)
*B29C 57/04* (2006.01)

(52) U.S. Cl.
CPC ............. *B29C 57/02* (2013.01); *B29B 13/025* (2013.01); *B29C 57/04* (2013.01)

(58) Field of Classification Search
CPC .......... B29C 57/04; B29C 57/02; B29B 13/025
USPC ................................ 425/318, 393
See application file for complete search history.

(56) References Cited

U.S. PATENT DOCUMENTS

| | | | |
|---|---|---|---|
| 3,890,079 A | 6/1975 | Slater | |
| 3,923,443 A | 12/1975 | Emery et al. | |
| 3,932,094 A | 1/1976 | Korff et al. | |
| 3,949,045 A | 4/1976 | Hess | |
| 4,009,982 A | 3/1977 | Maier | |
| 4,144,735 A * | 3/1979 | Rothenberger | B21D 41/026 72/393 |
| 4,264,661 A | 4/1981 | Brandolf | |
| 4,323,337 A | 4/1982 | Korff et al. | |
| 5,782,128 A * | 7/1998 | Barjesteh | B21D 19/08 72/318 |
| 5,928,451 A | 7/1999 | Johansson et al. | |

(Continued)

FOREIGN PATENT DOCUMENTS

| | | | |
|---|---|---|---|
| JP | 200218950 A | 8/1990 | |
| JP | 200218950 A2 | 8/1995 | |

(Continued)

*Primary Examiner* — Joseph S. Del Sole
*Assistant Examiner* — Thukhanh T Nguyen
(74) *Attorney, Agent, or Firm* — Larry K. Roberts

(57) ABSTRACT

An embodiment of a portable tube flaring system for flaring a flexible plastic tube end includes a hand-held wand with a heating element for heating a tube heater receptacle, which provides direct contact heating of the tube end about the entire outer periphery of the tube end. A mandrel device is configured for manual insertion into the heated tube end by the user after the tube end is removed from the wand and heater receptacle. A power/control unit is connected to the wand by a wiring bundle to provide electrical power to the heating element, and to optionally provide a visual and/or audio signal to the user for indicating when the tube end should be removed from the wand receptacle, and thereafter, when the mandrel may be removed from the tube end after sufficient cooling or curing time. The system may be carried by a person.

18 Claims, 15 Drawing Sheets

(56) References Cited

U.S. PATENT DOCUMENTS

| | | |
|---|---|---|
| 6,221,189 B1 | 4/2001 | Kieras et al. |
| 6,328,309 B1 | 12/2001 | Corbett, Jr. |
| 7,604,472 B2 | 10/2009 | Hayes, Jr. |
| 8,517,715 B2* | 8/2013 | Thorson ............... B29C 57/045 |
| | | 425/392 |
| 8,815,139 B2 | 8/2014 | Hayes, Jr. |
| 2001/0002755 A1 | 6/2001 | Rowley |
| 2005/0271764 A1* | 12/2005 | McKenzie ........... B21D 41/021 |
| | | 425/392 |

FOREIGN PATENT DOCUMENTS

| | | |
|---|---|---|
| JP | 0833682 A2 | 12/1996 |
| JP | 09039090 A2 | 2/1997 |
| JP | 3090779 U | 12/2002 |
| WO | 8900492 | 1/1989 |
| WO | WO 2005/002002 | 11/2005 |

* cited by examiner

PORTABLE TUBE FLARING SYSTEM FOR FLEXIBLE TUBING

CROSS-REFERENCE TO RELATED APPLICATION

This application claims priority from provisional application No. 61/843,555, filed Jul. 8, 2013, the entire contents of which application is incorporated herein by this reference.

BACKGROUND

Flexible and rigid tubing may have formed ends for use in coupling the tube to a fitting or to another tube. Flexible tubing may, for example, have flared ends to be joined to a flexible or rigid tube or fitting. A flared tube may be joined without a bushing and/or a nut. The inner diameter of the flare may be sized to accept and be joined to the outer diameter of a tube or fitting. The end of rigid tubing may be formed into a flare or flange.

Flexible tubing ends may be formed into flares using "cold flare" tools or heated flare tools. Cold flare tools use pressure alone to shape a tube end into a flare. Conventional heated flare tools unevenly heated the end of a tube and may use a flare form inserted into the tube to form a flare. Shaped tube end flares made by these methods typically lose their shape, due to the elastic memory of the tubing, at normal operating temperatures and pressures. As a result, the connections to the flared ends often developed leaks over time.

U.S. Pat. No. 7,604,472 B2, hereinafter referred to as the '472 patent, describes a method and apparatus for forming flared tube ends, the entire contents of which are incorporated herein by this reference. As described at column 1, line 66 to column 2, line 14 of the '472 patent, a flared tube end may be used in coupling a flexible tube to a tube, pipe or fitting. FIG. 1 of the '472 patent illustrates an exemplary embodiment of a flexible tube 1 with a flared end 2 to be fitted to a mating portion 3. A nut 4 may be provided to mate with threads 5 on the mating portion 3 to secure the fitting. The inner profile 6 of the flared end 2 of the flexible tube 1 may be formed to conform to the profile of the outer surface 7 of the mating end 8 of the mating portion 3. The flexible tube may be selected so that the inner diameter 9 of the flexible tube 3 matches the inner diameter 10 of the mating portion 3 where the interior surface 11 of the flexible tube meets the interior surface 12 of the mating portion 3, which may provide surface continuity along the interior surfaces of the fitting and may reduce the likelihood of leaks or fitting failure. In an exemplary embodiment, the flare is at a 45 degree angle with a 0.060 inch radius. The method and system disclosed in the '472 patent solved the problems of leakage, and provided flared flexible tubing ends which provide excellent performance against connection leakage.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
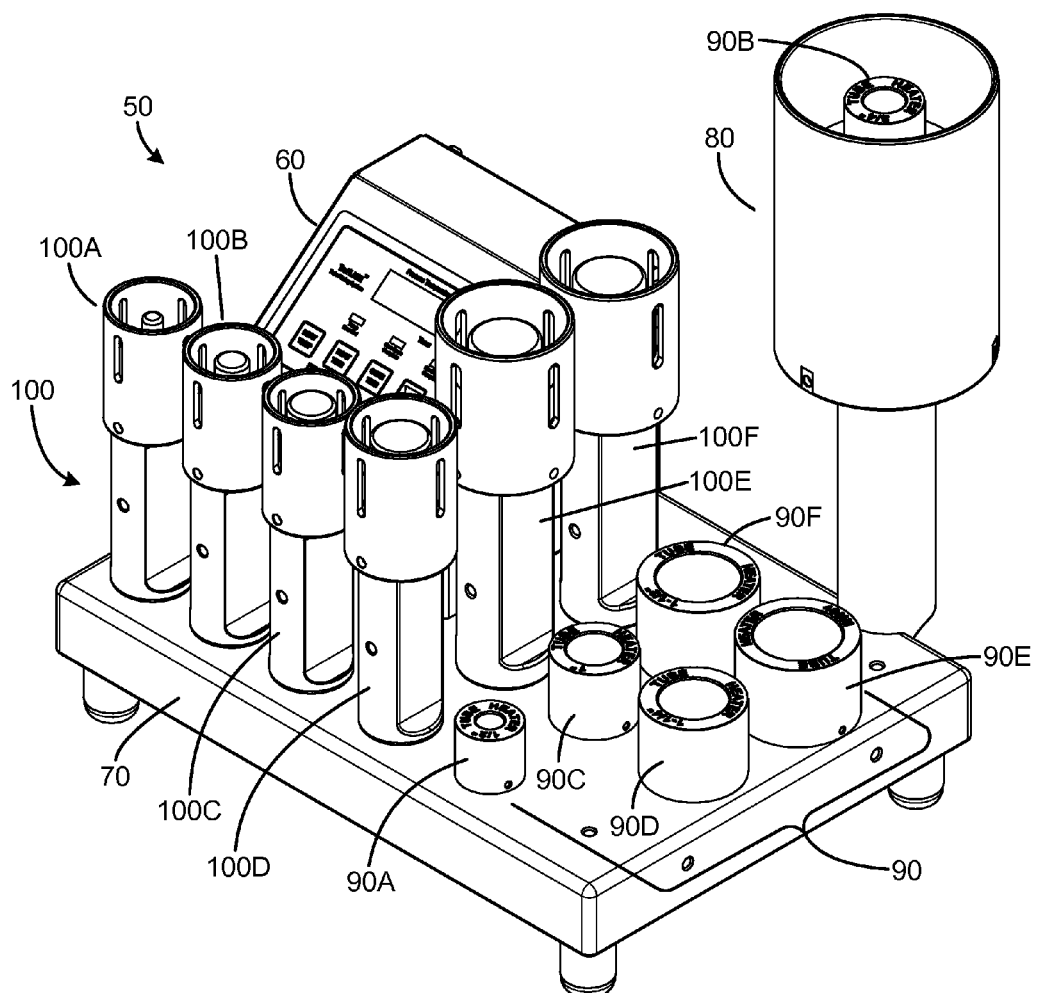
FIG. 1 is an isometric view of an exemplary embodiment of a portable tube flaring system for flaring ends of flexible plastic tubing.
Figure 2A:
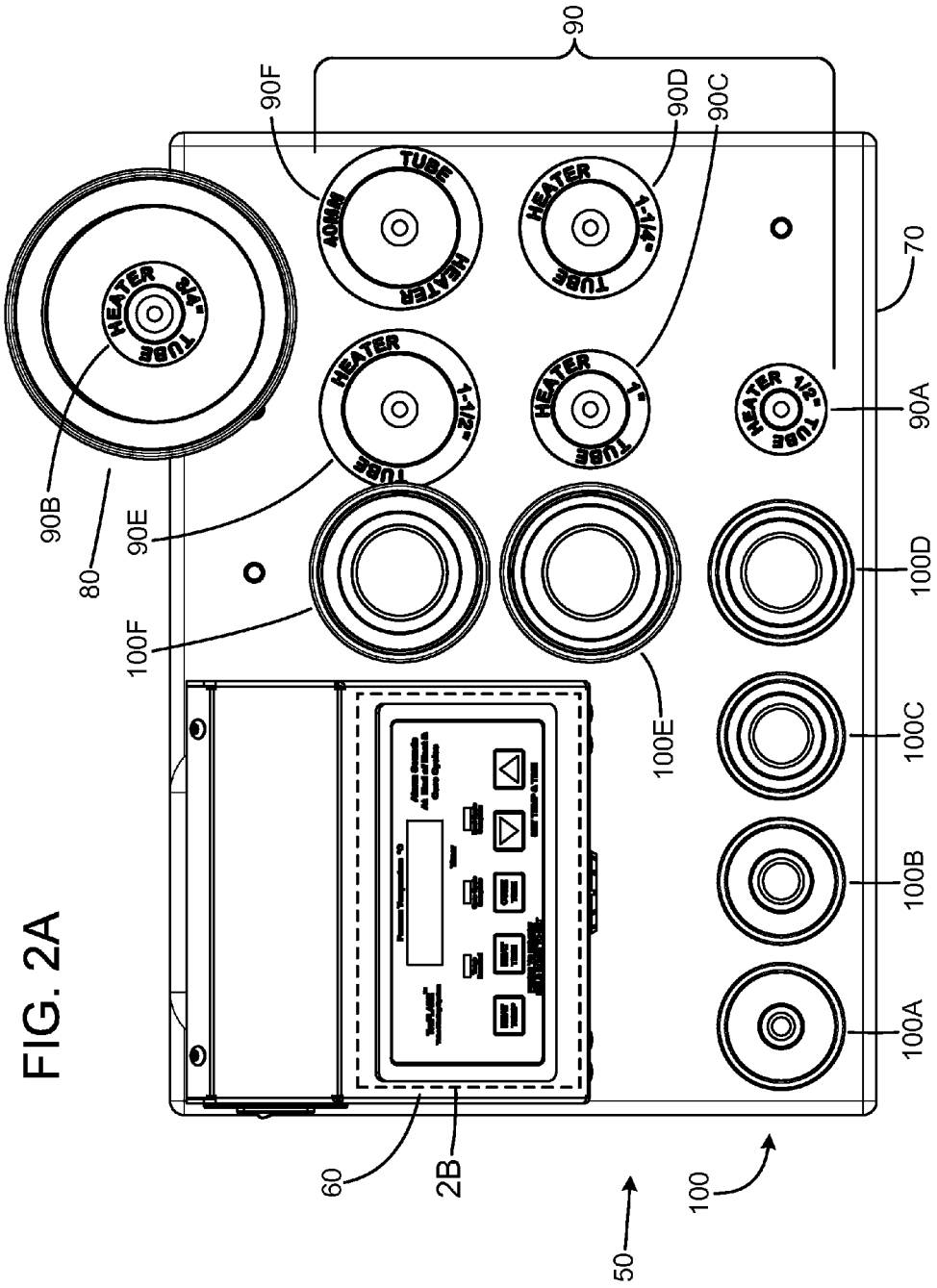
FIG. 2A is a top view of the system of FIG. 1.
Figure 2B:
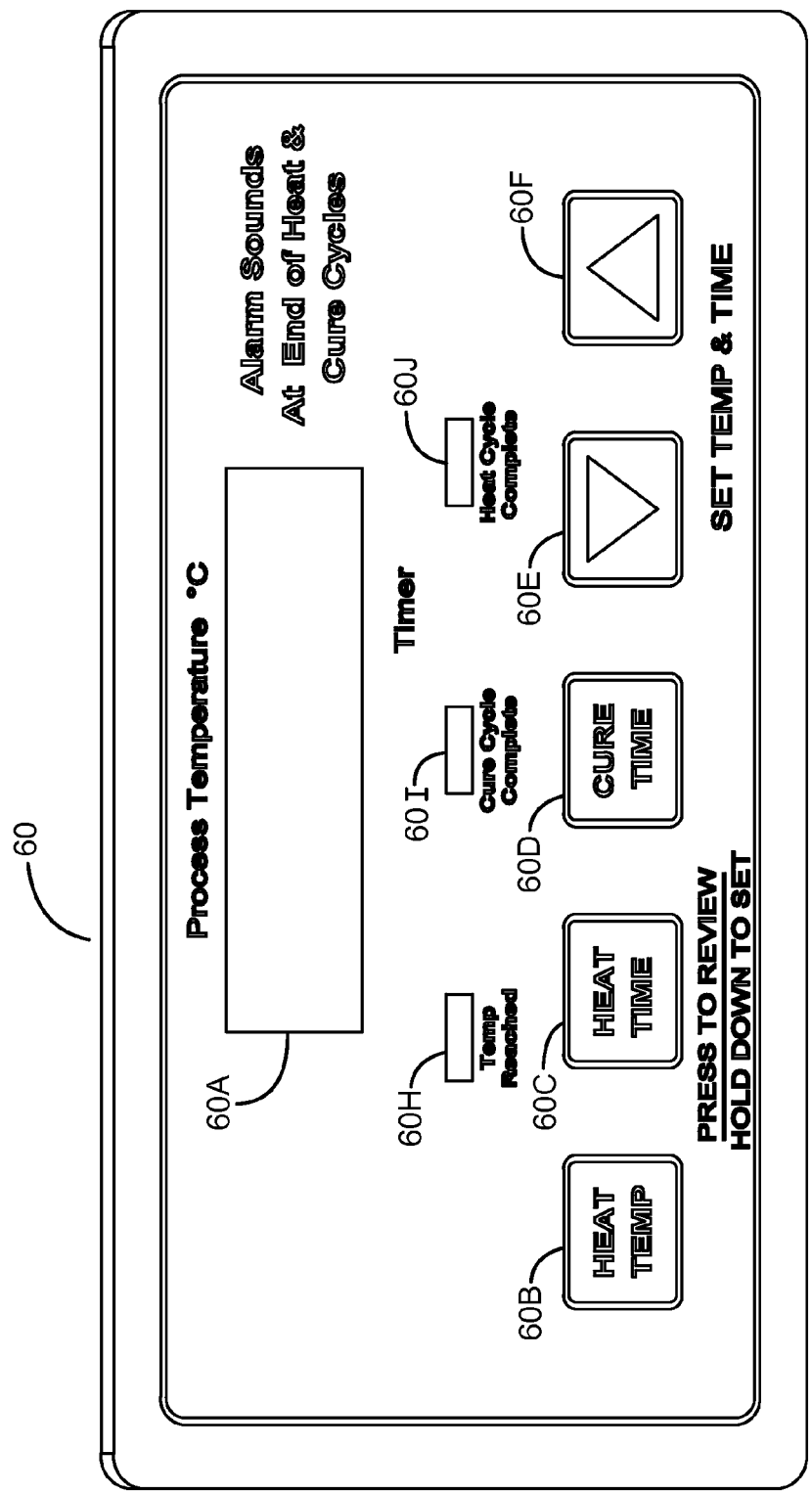
FIG. 2B is an enlargement of the area within dotted line 2B.
Figure 3:
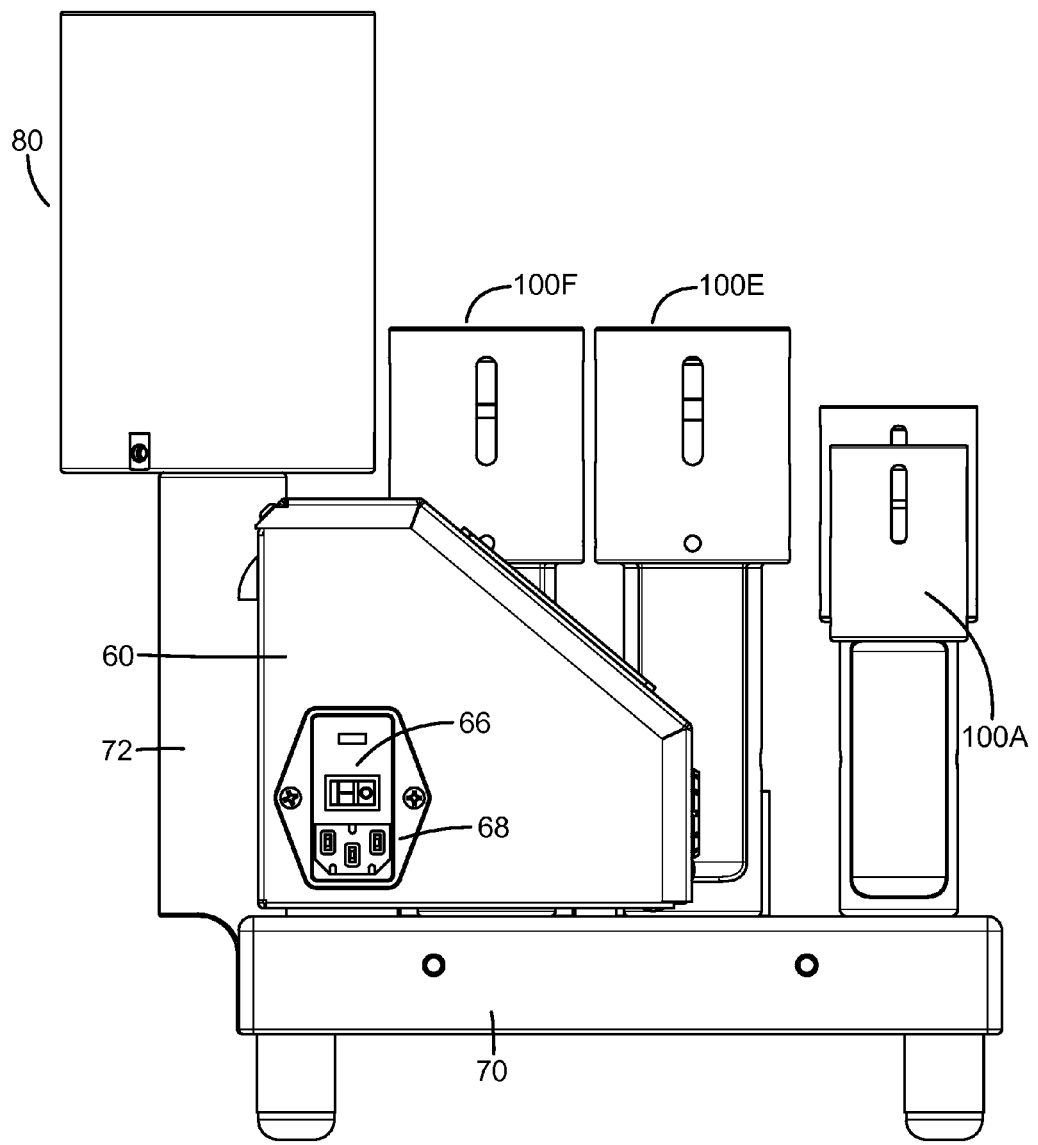
FIG. 3 is a left side view of the system of FIG. 1.

In the following detailed description and in the several figures of the drawing, like elements are identified with like reference numerals. The figures may not be to scale, and relative feature sizes may be exaggerated for illustrative purposes.

Some installations using flexible plastic tubing, such as pharmaceutical and semiconductor fabrication plants, use large and complex tubing systems to carry various liquids. It is quite common for plastic tubing runs to end at locations which are hard to access, either because the locations are remote, or in hard-to-reach positions. A tubing manifold may have a complex layout of many tubes, limiting access due to space constraints. A tubing manifold may be elevated or in a well, and only accessible by a lift of some sort.

A commercial embodiment of the system and method described in the '472 patent, is typically used as a bench mounted system, with its tubing end heater and its clamping system for holding the heated tubing end while a mandrel is pressed into the tubing end to make the flare. While this system provides highly accurate tube flares with excellent connection performance, some users have not been able to use a bench mounted system to perform the last flare in a tubing run, due to the inaccessibility of the tubing end at the end of the run.

An exemplary embodiment of a portable tube flaring system 50 is described, and illustrated in FIGS. 1-6D and 8. This system provides a hand-held wand 80 with a heating element 86F for heating a tube heater receptacle (90A-90F), which provides direct contact heating of the tube end about the entire outer periphery of the tube end. In an exemplary embodiment, the plastic tube to be flared is a fluoropolymer tube, although the system is usable with other plastic tubes. Exemplary plastic tube material compositions that can be flared with this portable system include PFA, FEP and PVDF. The system also provides a mandrel device, or in this embodiment, a set 100 of mandrel devices of different sizes, for manual insertion into the heated tube end by the user after the tube end is removed from the wand and heater receptacle. A timer circuit may be provided to provide a visual and/or audio signal to the user for indicating when the tube end should be removed from the wand receptacle, and thereafter, when the mandrel may be removed from the tube end after sufficient cooling or curing time.

In contrast to the system of the commercial embodiment of the '472 patent, the portable system 50 does not employ a tube clamping mechanism for clamping the heated tube for insertion of the mandrel. It has been found that a portable system as described herein, while perhaps not providing a flare which is as dimensionally stable as flares created with the bench mounted system, still provides a high quality flare which provides good, acceptable performance against leaks when connected to other tube fittings.

In an exemplary embodiment, the system 50 includes a power/controller unit 60, mounted on a base 70. In an exemplary embodiment, the base is sufficiently small, and the components light enough, so that the system may be hand carried by a single person. In an exemplary embodiment, the base 70 is about 10 inches by 14 inches in width and length. The power/controller unit is configured to receive electrical power, e.g. AC line voltage, power an electric heater 86F in the wand 80, and includes user control and logic functions allowing the user to turn on power, set heater power levels and timers, and initiate a timer sequence. The unit 60 is configured to maintain a wand heater temperature at a set temperature point, by monitoring a temperature sensor 86G, e.g. a thermocouple, in or adjacent the wand heater. A wand holster 72 is fitted to the back side of the base 70, with a slot, and received the wand in a storage position shown in FIG. 3, for example. The slot in the side of the holster allows the wiring bundle or cable connected to the wand to fit into the slot.

The system includes at least one and preferably a set 90 of heater receptacle devices 90A-90F. Each heater receptacle device is a hollow cup-like structure, fabricated of aluminum in this exemplary embodiment, defining a hollow cylindrical receptacle chamber of a diameter to match the outer diameter of the tube to be flared, and a depth defining the length of the tube end to be heated. FIG. 5B shows exemplary heater receptacle 90F mounted in the wand 80, defining a hollow cylindrical receptacle chamber 90F2, with a depth D and a diameter ID.

The system 50 further includes, in this exemplary embodiment, at least one, and preferably a set 100 of mandrel devices 100A-100F of different sizes, and a set 90 of heater receptacle devices 90A-90F, of different inner diameter (ID) sizes which correspond to the tubing outer diameter (OD). In this exemplary embodiment, the heater receptacle devices 90A-90F have IDs of ½ inch, ¾ inch, 1 inch, 1¼ inch, 1½ inch and 40 mm, respectively, corresponding to the OD of flexible plastic tubing to be flared. The mandrels 100A-100F have corresponding internal mandrel tip dimensions reduced by the nominal tube thicknesses for the corresponding tube size. The sets of receptacle devices and mandrel devices are removably attached to the base 70. In an exemplary embodiment, the base 70 is fabricated of a thermally conductive material such as aluminum, serving to cool receptacles which have been heated by the wand heater and replaced onto the base. In an exemplary embodiment, the heater receptacle devices each have a threaded fastener protruding from the bottom surface thereof, which is threadingly received in a threaded bore in the base 70, and also in a heater block in the wand. The mandrel devices have interior bores which receive a protruding post from the top surface of the base 70. Each post has a circumferential groove, which receives a spring-loaded ball secured in the mandrel device to secure the mandrel device in place, yet also allowing the mandrel device to be pulled off its post for use. Other attachment techniques may alternatively be used for removably securing the mandrel devices and receptacle devices to the base 70. The system 50 may be moved by a user, with the sets 90 and 100 held firmly in place on the base.

The set 90 of heater receptacles devices in this exemplary embodiment are hollow receptacle devices, fabricated of a metal such as aluminum with high heat conductivity. The receptacles are configured to be removably installed into the wand 80 in intimate contact with a heater block, so that the receptacles are brought up to a desired operating temperature. The heating receptacles may comprise aluminum with a nickel-polymer coating, to help prevent the tube from sticking to the surface of the heater receptacle and may prevent the contamination of the tube end through oxidation of the aluminum. Other suitable coatings for a heating structure may alternatively be employed, for example Teflon or PTFE.

Figure 4:
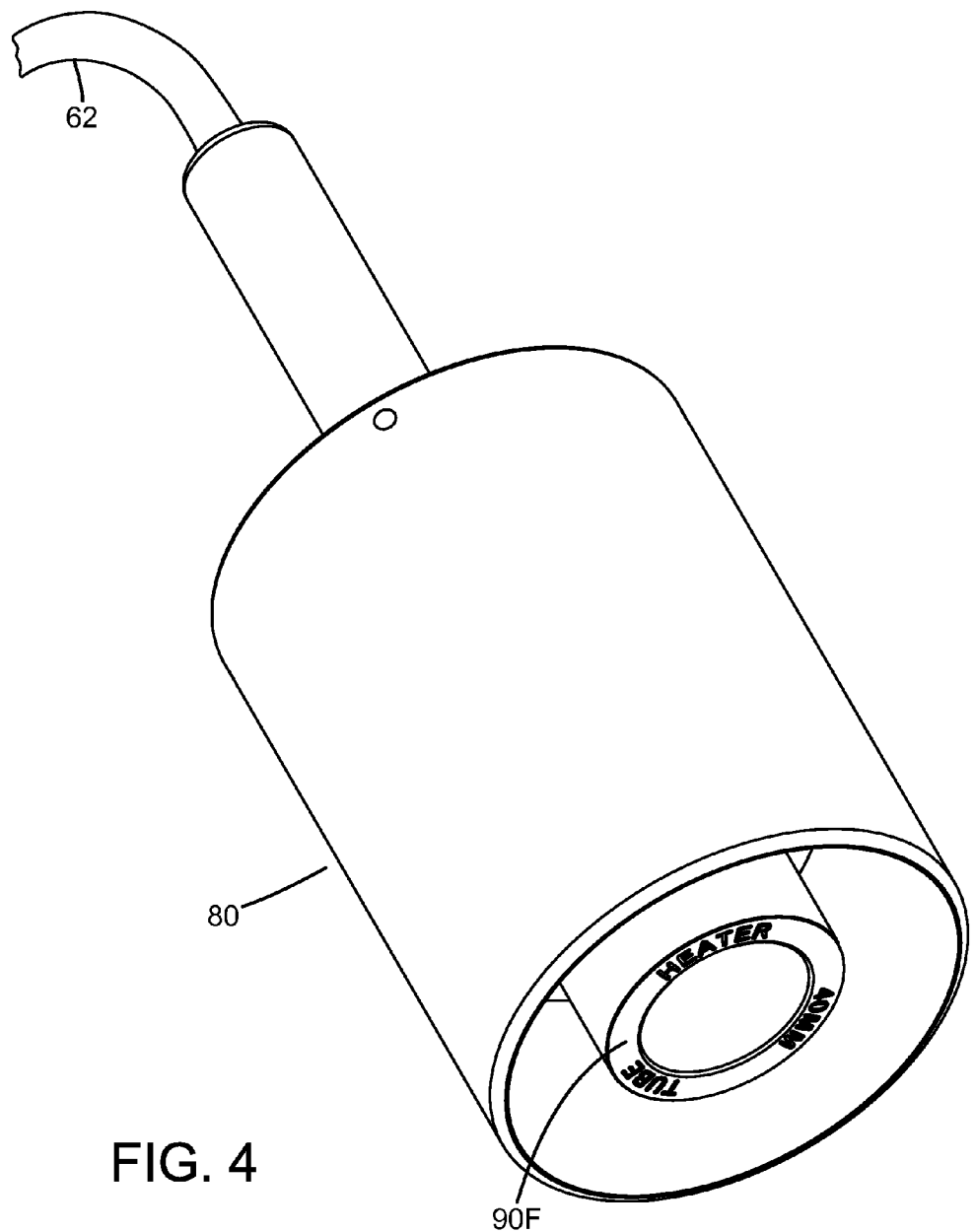
FIG. 4 is an isometric view of an exemplary embodiment of the heating wand of the system of FIG. 1.
Figure 5A:
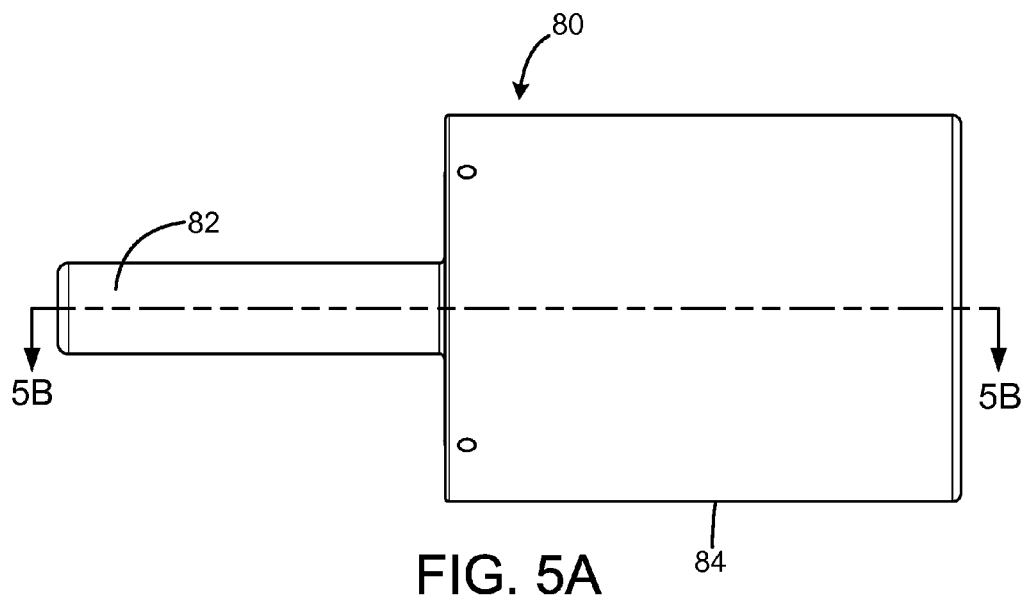
FIG. 5A is a side view of the heating wand of FIG. 4.
Figure 5B:
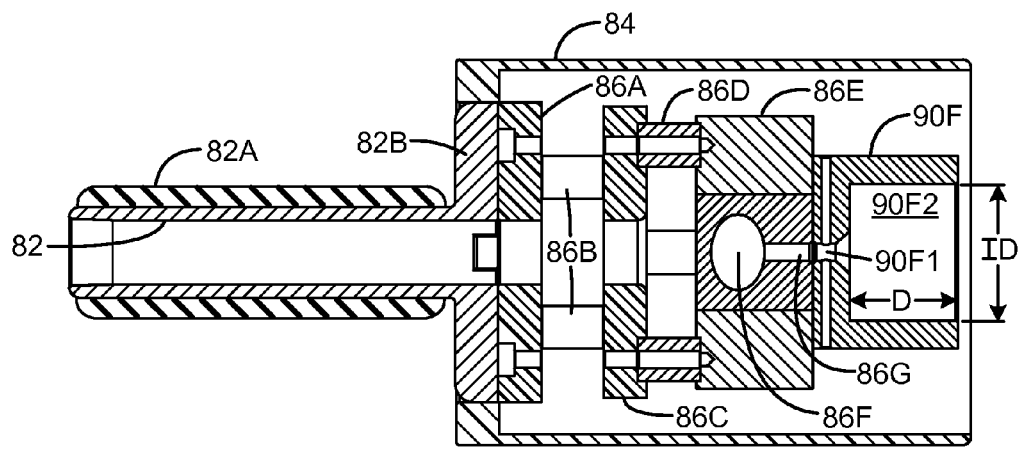
FIG. 5B is a cross-section view of the wand, taken along line 5B-5B of FIG. 5A.
Figure 6A:
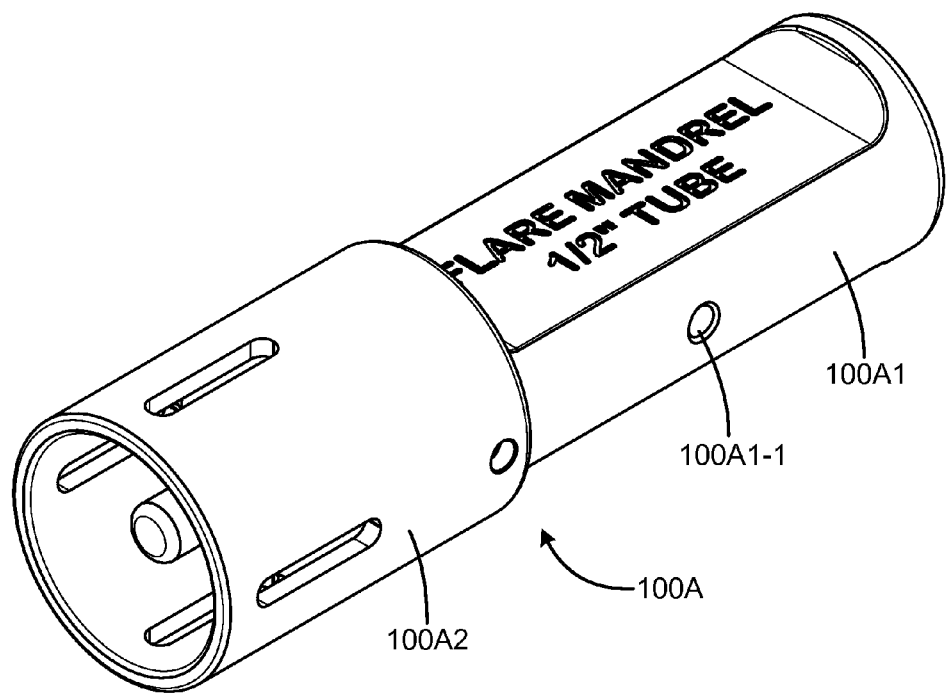
FIG. 6A is an isometric view of an exemplary embodiment of a mandrel device.
Figure 6D:
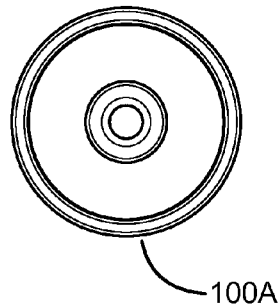
FIG. 6D is an end view of the mandrel device of FIG. 6A.
Figure 6B:
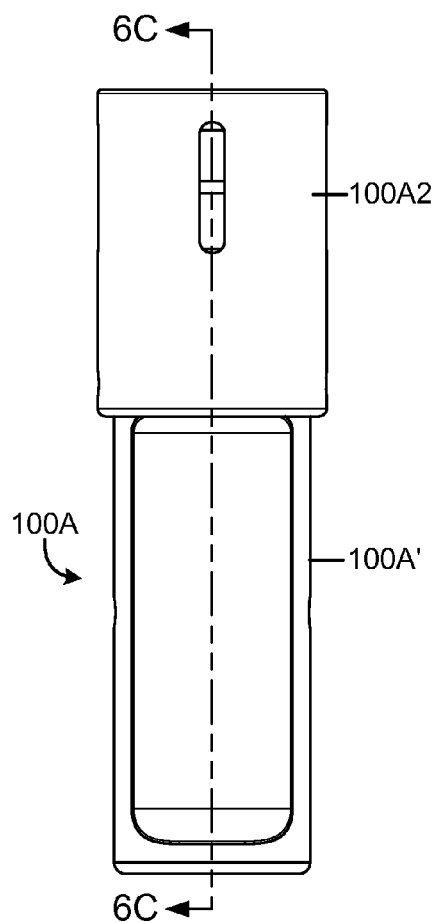
FIG. 6B is a side view of the mandrel of FIG. 6A.
Figure 6C:
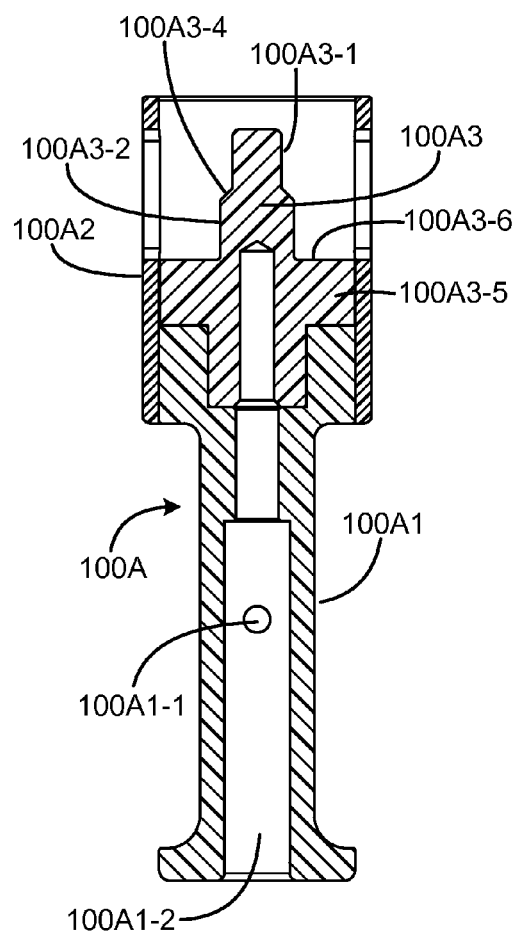
FIG. 6C is a cross-sectional view taken along line 6C-6C of FIG. 6B.

An exemplary embodiment of the wand 80 is illustrated further in FIGS. 4 and 5A-5B. In this embodiment, the wand includes a wand handle portion 82, which may be covered by a sleeve 82A to provide insulation against heat transfer. The sleeve may be a silicon sleeve, for example. The handle portion 82 is T-shaped in cross-section (FIG. 5B), with a base portion 82B having a flat surface. The handle may be aluminum, for example. An external heat shield 84 is attached to the base portion, and may be fabricated of a plastic material such as LEXAN™ for example. A first heat insulator plate 86A is attached to the flat surface of the base portion of the handle, and is connected by stainless steel standoffs 86B to a second heat insulator plate 86C. The plates 86A and 86C are fabricated of a heat insulating material. A heater block 86E is supported by standoffs 86D above the second heat insulator plate, and is fabricated of a heat conducting material, such as aluminum. In an exemplary embodiment, the heater block is 3.5 inches in diameter, and includes a chamber in which the heater element is received. The heater element can be a Calrod element, e.g. ⅝ inch in diameter and 3 inches long, with electrical wiring passed through the heater block and the heater handle to the wiring 62, connected to the power/controller unit 60. Other electrically powered heating elements may alternatively be employed.

The heater block 86E includes a threaded bore 86G, for attachment of one of the heater receptacle set 90 to the heater block, by a threaded fastener 90E-1, for example. A set screw may also be used to secure the receptacle in place.

An exemplary one (100A) of the set 100 of mandrel devices 100A-100F is shown in FIGS. 6A-6D; the others are similar but of different sizes. The mandrel device includes a plastic handle 100A1, which has an internal bore or opening 100A1-2 formed there through to receive a post extending from the surface of the base 70 to store the mandrel device. A threaded opening 100A1-1 is formed in the handle, to serve as a mount for a spring loaded set screw and ball mount, to hold the mandrel device in a storage position with the ball engaged into a groove in the post. The mandrel device includes the mandrel 100A3, which is secured to the handle by a threaded fastener or other means. The mandrel 100A3 is formed of PTFE in this exemplary embodiment, although other materials such as stainless steel may alternatively be employed. In an exemplary embodiment, the mandrels preferably comprise material which is inert with respect to the material comprising the flexible tube end to be formed. This may prevent contamination of the tube which may be desirable in some applications. In an exemplary embodiment, the flare forming mandrels may have substantial heat capacity and comprise material with good thermal conductivity. This may improve cooling of the tube end during flare formation and may reduce the time required to keep the mandrels positioned in the flare forming position reduce the time for the end of the tube to reach a state where it will retain its flared form.

The mandrel 100A3 includes a profile conforming to the inner profile of a flare to be formed in the flexible plastic tube end as shown in FIG. 1 of the '472 patent). The mandrel profile includes a cylindrical tip portion 100A3-1 with a diameter nominally equal to the ID of the flexible tube to be flared, a tapered transition region 100A3-4, and flare portion 100A3-2 which is nominally the diameter of the OD of the flared portion to be formed. The mandrel defines a tube stop surface 100A3-6, against which the tube end contacts when the mandrel has been inserted into the heated tube end.

The exemplary mandrel device 100A includes a clear polycarbonate plastic cylindrical shield 100A2 attached to the handle 100A1 and the mandrel 100A3, to provide a shield between the mandrel and hot tube end and the user's hand during operation.

The end of a tube to be formed into a flare may be heated to a temperature just below the melting point of the material comprising the tube. The material should be heated to a near-melted state where the tube end is completely softened, pliable and susceptible to being reshaped. Suitable flexible tubing to be pre-heated for forming flared connectors may comprise, for example, plastic materials such as PFA (perfluoroalkoxy), FEP (fluoroethyl propylene) or PVDF (polyvinyldene fluoride). The suitable temperature range for pre-heating flexible tubing prior to forming of a flare may be about 480-520 degrees Fahrenheit for PFA, 390-440 degrees Fahrenheit for FEP, and/or about 240-300 degrees Fahrenheit for PVDF. Once the tube end has been heated to a near-melted state, the tube end may be manually removed from the wand receptacle. The user then, holding the appropriate mandrel device, pushes the heated end of the tube onto the mandrel until it stops against the stop shoulder, and manually holds the mandrel and tube end in place for a first cure time period, after which the user may place the tube end with the mandrel still in place in the tube end on a work surface or other support, and after a second cure time remove the mandrel from the tube end. The cure time period will depend on the tube size and material, and is sufficiently longer to allow the tube end to cool sufficiently for the flare to retain its reformed state.

Features of the power/control unit 60 are illustrated in FIGS. 2A, 2B, 3 and 8. The unit 60 has an on/off switch 66, and is powered by AC line voltage, e.g. 120 AC, using a power cord connected to power port 68. The unit 60 includes a user interface panel, with a display 60A configured to display the process temperature. Buttons 60B, 60C and 60D are pressed by the user to select one of the process variables, heat temperature, heat time and cure time, to be set by use of buttons 60E and 60F. LED panel indicators 60H, 60I, 60J indicate that the set temperature has been reached, the cure cycle is completed, and the heat cycle is completed, respectively. The unit 60 is configured to generate audible sounds at the end of the heat and cure cycles. The wand 80 is connected to the power/control unit 60 by wiring bundle 62, which includes power wiring for powering the heating element 86I in cavity 86F in the wand, and low voltage wiring connecting the temperature sensor 86G and the user-operable switch 86H on the wand to the controller 60K of unit 60. In an exemplary embodiment, the wiring bundle is at least ten feet long, to allow the wand to be used remotely at a distance from the power/controller unit 60. The controller is configured to provide timer functions. The controller 60K may be implemented by discrete logic, a microprocessor, or FPGA or other logic array.

The pre-heating, combined with the mandrel flare forming, may create consistent flares which hold their shapes at a wider range of operating temperatures and for longer periods of time. The pressure formed flares may retain their shapes at higher temperatures and for longer periods of time than cold formed flares or heat-formed/non-compression formed flares.

The flare formed in the tubing may have an outer flare inner circumference, an inner tubing circumference and an inner sloped profile from the outer flare inner circumference to the inner tubing circumference. The outer flare inner circumference can be formed to match the outer circumference of a fitting with which the tubing is to be mated to achieve a tight fit and seal. The slope or profile of the flare may be formed to match the outer profile of the end of a fitting with which the tube is to be mated. The inner tubing circumference may be chosen to match the inner circumference of the fitting with which the tubing is to be mated. By carefully matching the outer flare circumference, slope profile and inner tubing circumference with the outer circumference, tube end profile and inner circumference of a flare with which the flared tubing is to be mated, a tight seal may be formed. Where the fittings with which flared tubing is to be mated has been fully molded to a consistent size and profile, the flare forming apparatus can create matched flare connections which consistently mate with the molded fittings. The tight fit may provide a smooth through-bore in the connection, reduce turbulent flow within the system and may reduce the likelihood of leaks or fitting failures. The matched flare fitting may also prevent "cold flowing" (deformation of a fitting and/or tube flare from over tightening due to poor interface on an unmatched flare) and reduce or eliminate "entrapment areas" (gaps at the flare/fitting interface). A pressure formed flare connection may provide full engagement between the tube and fitting and may have at least about 90-95% surface engagement between the flare and fitting.

An exemplary process for using the system 50 to flare a flexible tube end is as follows:

1. Select tube size to be flared. Select and mount the heater receptacle (90A-90F) appropriate for the selected tube size in the wand 80.
2. Refer to process guide settings below to select proper settings for the tube size.
3. To set the heat temperature, heating time, and cure time press and hold down the appropriate button on the control panel, "HEAT TEMP", "HEAT TIME" or "CURE TIME." Use the arrow buttons to reach the desired setting according to the guidelines in the table for the selected tube size.
4. To begin flaring, after the wand heater receptacle has reached the set temperature and the tube end has been pushed into the receptacle, push the button switch 86H on the wand 80 and a "Heat Cycle" timer starts, after the Heat Timer sounds the alarm, pushing the push button switch will turn off the beeper.
5. Remove the tube end from the wand heater receptacle and push the mandrel of the appropriate mandrel device into the heated tube end. Push the button switch again and a first stage forming/cure cycle is started, 60 seconds long in this exemplary embodiment. The mandrel is held by the user in place in the tube end during the first stage forming/cure cycle. When the first stage forming/cure time has elapsed, the use pushes the wand button switch to turn off the beeper.

6. The user at this stage of the process may manually release the tube end, while leaving the mandrel in place in the tube end, and may lay the tube end down on a convenience surface. The user pushes the button switch again and a second cure cycle timer will start. The time period of this cure cycle is variable, depending on the size and material of the tube; exemplary values for PFA tubing are set out in the table below. After the second cure cycle ends, a beeper is sounded, and pushing the button switch 86H will turn off the beeper. A new operation will be started with the next push of the push button 86H. The heat cycle and second cure cycle timers are adjustable to 999 seconds.

If the push button 86H is inadvertently pushed during any cycle countdown, the controller is configured to flash an LED and it requires that the push button on the wand be reactivated to continue the cycle countdown. Also the cycle in process can be canceled or restarted by turning off the power switch 66 while the LED is flashing.

The following PFA tube sizes can be flared on an exemplary embodiment of the system:

| Tube Size | Heat Temperature (° C.) | Heat Time (sec) | Cure Time (sec) |
| --- | --- | --- | --- |
| ¼ in. OD × 5/32 in. ID | 270° | 20-30 | 30-40 |
| ⅜ in. OD × ¼ in. ID | 270° | 40-50 | 60-80 |
| ½ in. OD × ⅜ in. ID | 270° | 50-60 | 80-90 |
| ¾ in. OD × ⅝ in. ID | 270° | 70-80 | 100-120 |
| 1 in. OD × ⅞ in. ID | 270° | 80-90 | 120-150 |
| 1.25 in. OD × 1.10 in. ID | 285° | 180 | 480 |
| 1.50 in. OD × 1.31 in. ID | 285° | 240 | 600 |
| 40 mm OD × 35.2 mm ID | 285° | 300 | 720 |

The foregoing process variables may be adjusted for different tube materials and sizes. For example, FEP tubing typically requires less heat time, e.g. around 35% less, than the variable values set out in the above table for PFA tubing.

Figure 7A:
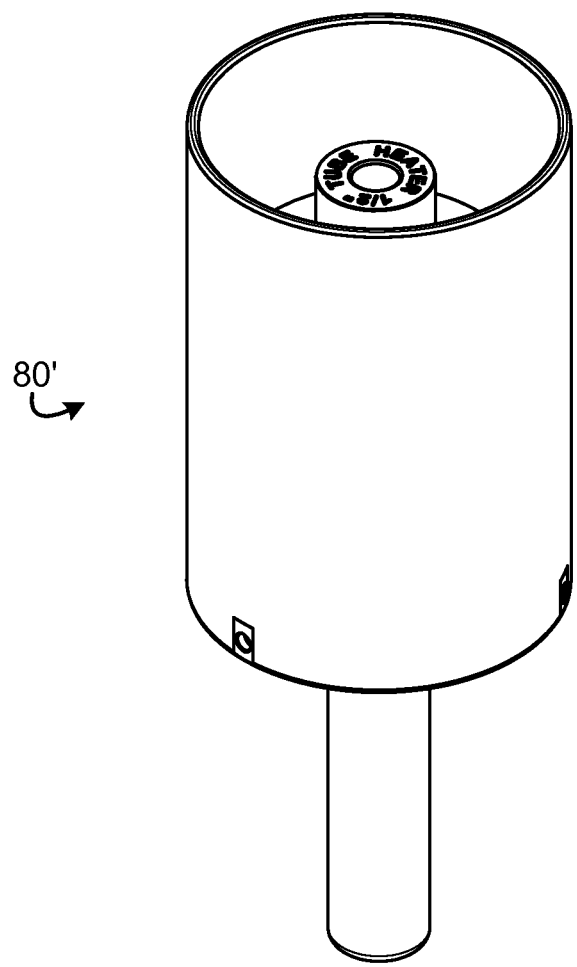
FIG. 7A is an isometric view of an exemplary alternate embodiment of a heating wand.
Figure 7B:
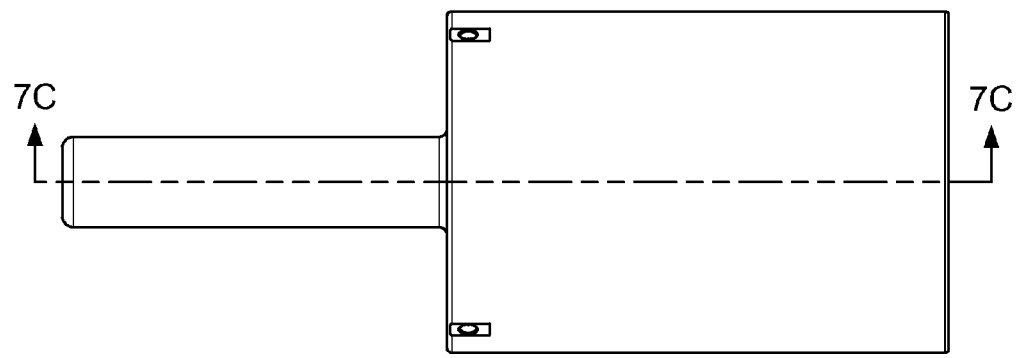
FIG. 7B is a side view of the heating wand of FIG. 7A.
Figure 7C:
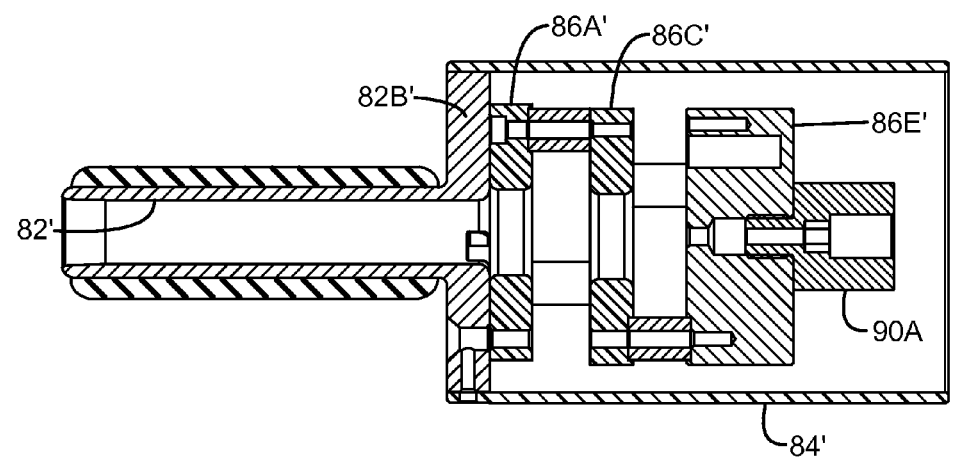
FIG. 7C is a cross-sectional view taken along line 7C-7C of FIG. 7B.
Figure 8:
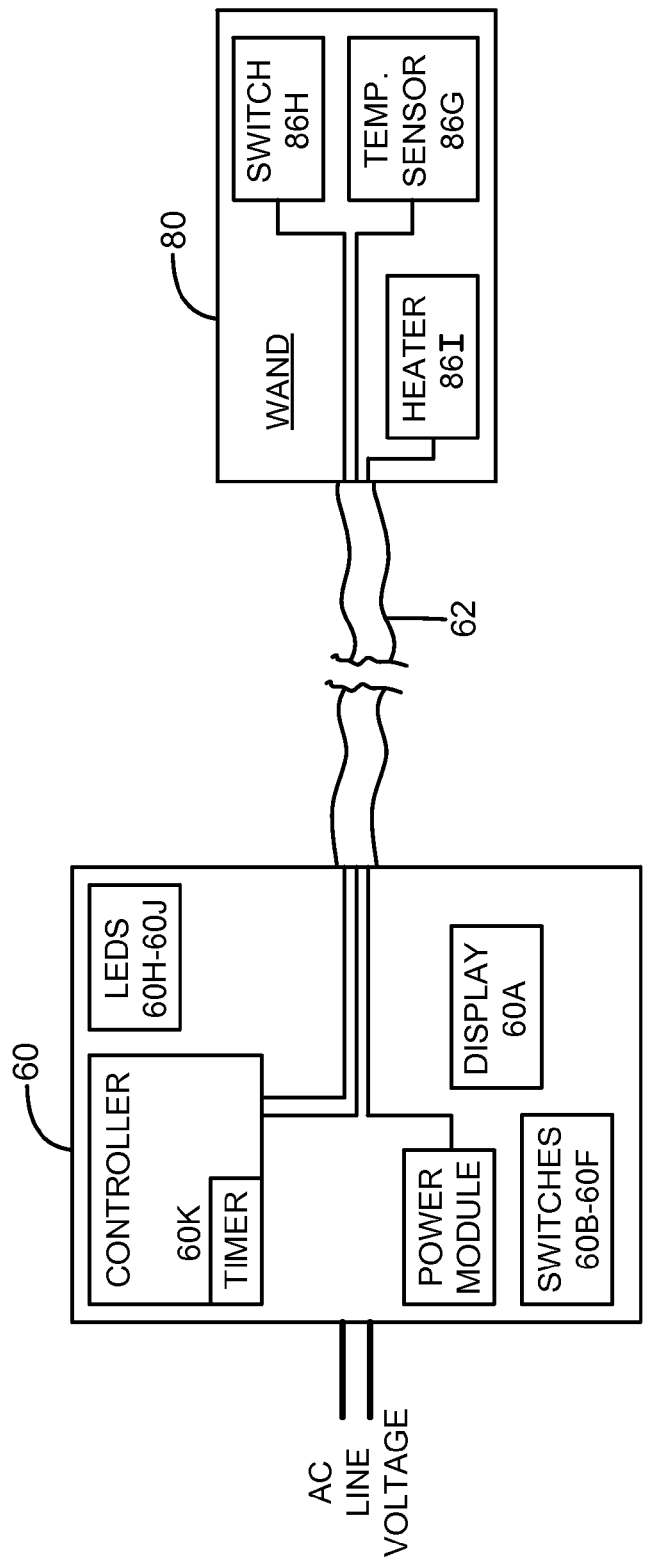
FIG. 8 is a simplified schematic diagram illustrating features of an exemplary embodiment of a tube flaring system.
Figure 9:
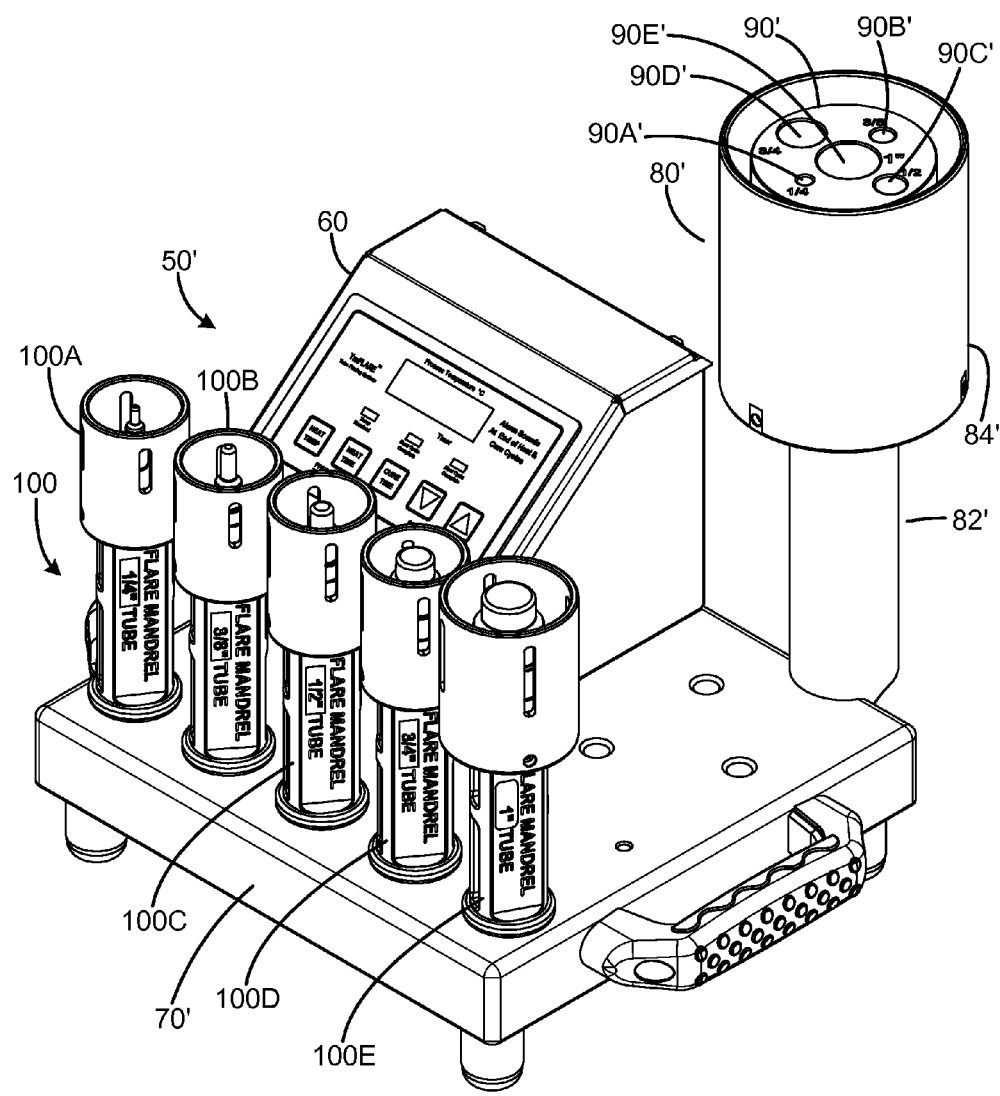
FIG. 9 is an isometric view of another exemplary embodiment of a portable tube flaring system for flaring ends of flexible plastic tubing.
Figure 10:
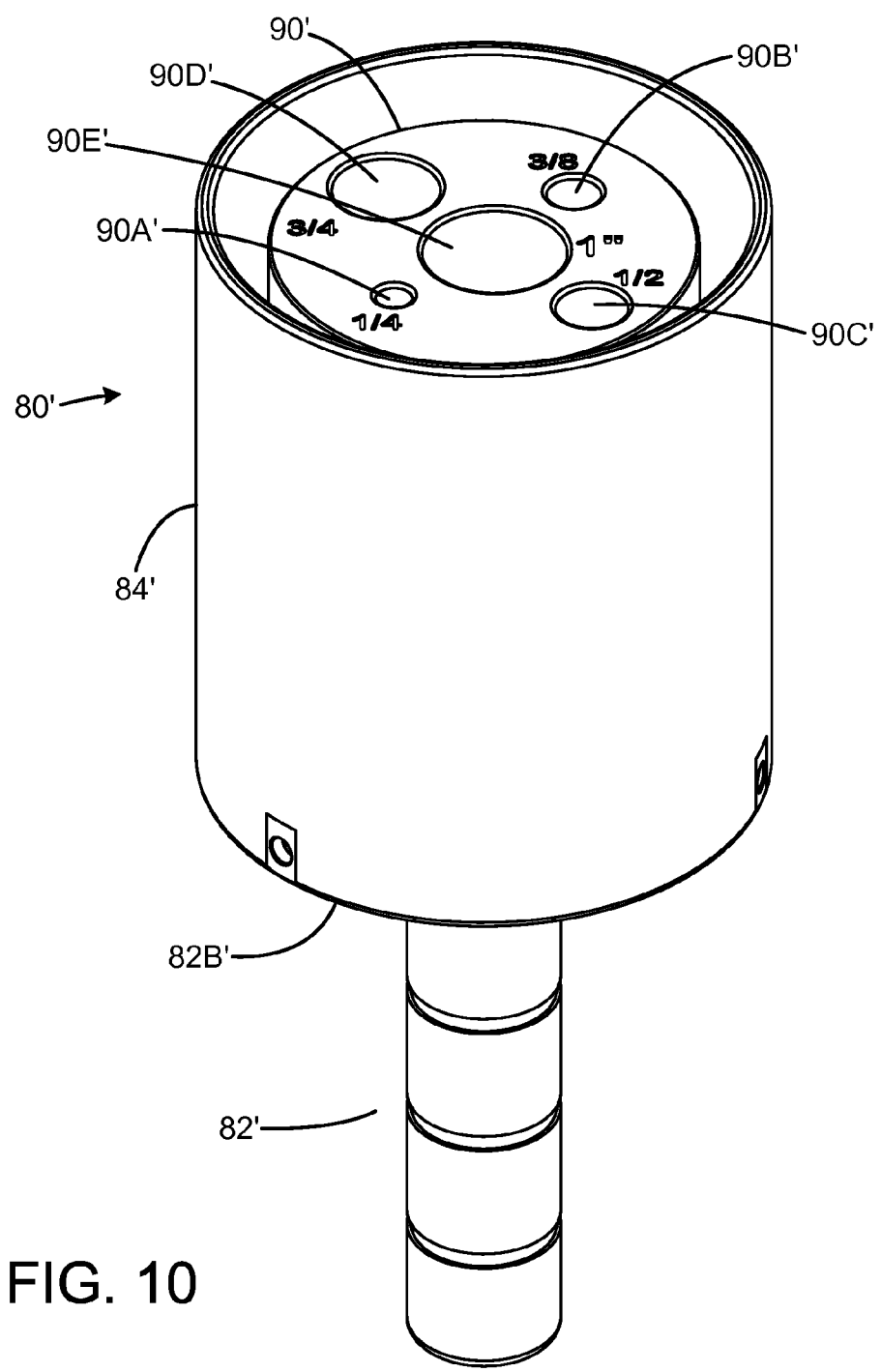
FIG. 10 is an isometric view of an exemplary embodiment of the heating wand of the system of FIG. 9.
Figure 11:
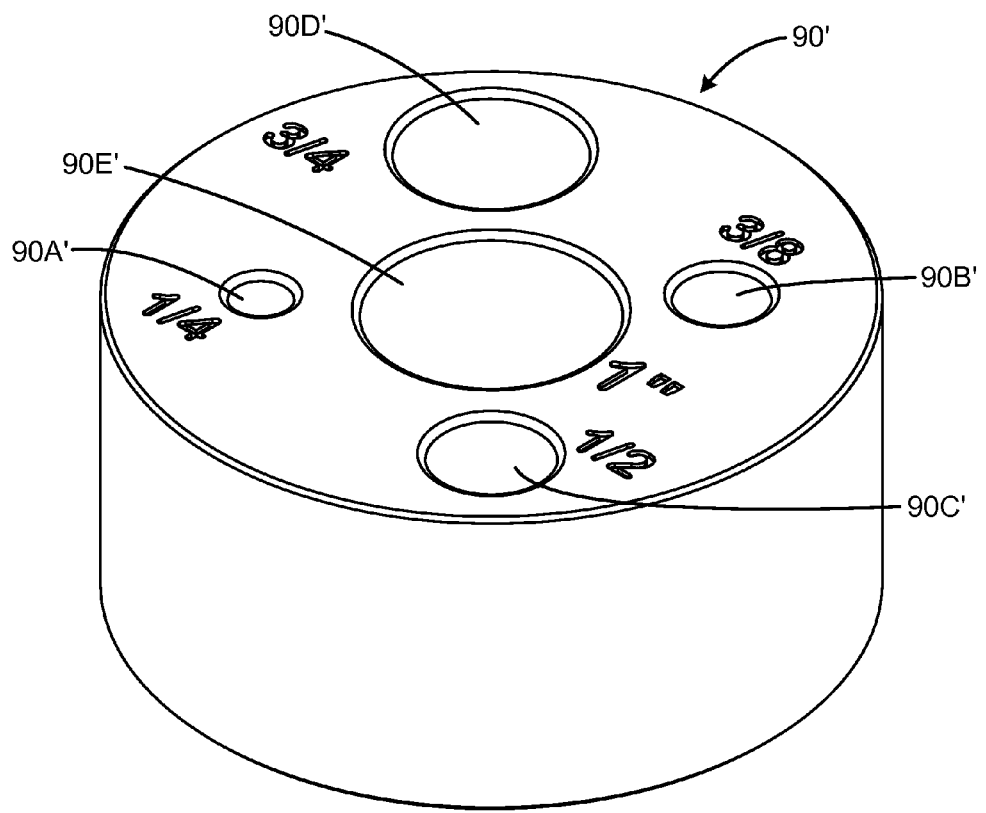
FIG. 11 is an isometric view of an exemplary embodiment of a multi-receptacle structure for the wand embodiment of FIGS. 9 and 10.
Figure 12A:
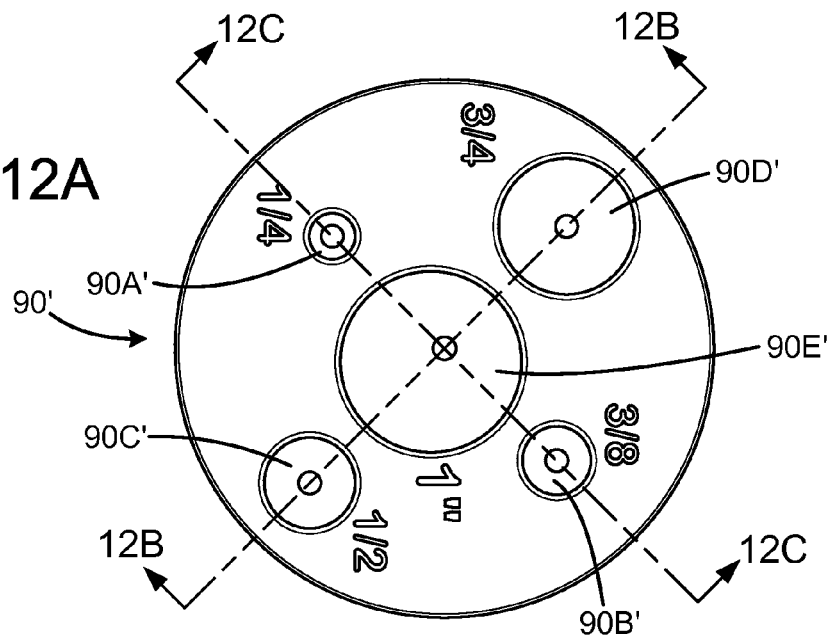
FIG. 12A is a top view of the multi-receptacle structure of FIG. 11.
Figure 12B:
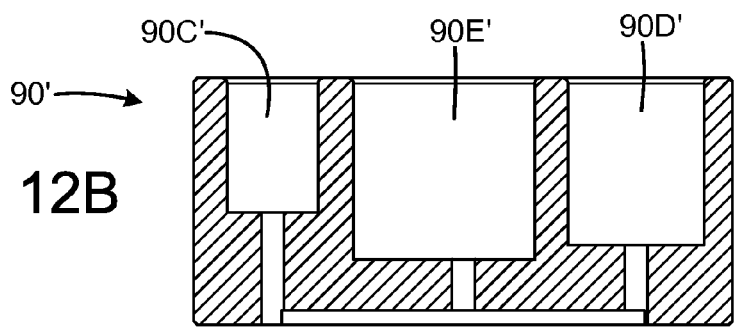
FIGS. 12B and 12C are cross-sectional views respectively taken along lines 12B-12B and 12C-12C of FIG. 12A.
Figure 12C:
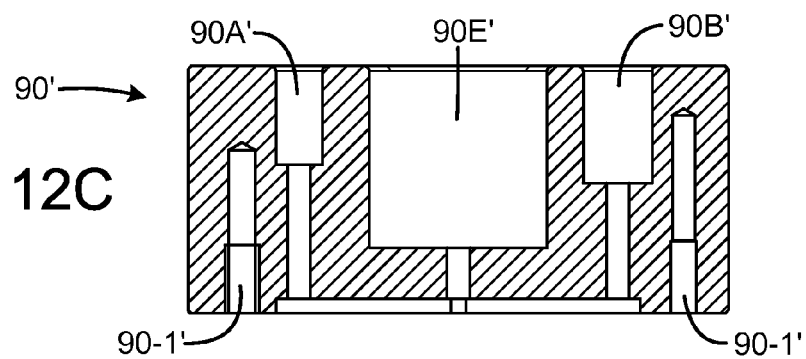

FIGS. 7A, 7B and 7C illustrate an alternate embodiment of a wand 80' for a portable flare forming system. This embodiment may have a smaller footprint size, to fit into tighter locations, and provide a somewhat reduced heat capacity, for use with a different heater receptacle set, e.g. heater receptacles with IDs between ¼ inch and 1 inch, in contrast to the receptacle ID range of ½ inch through 40 mm for the system illustrated in FIGS. 1-6D. While an exemplary embodiment of the wand 80 may have a heater block outer diameter of 3½ inches for the shield 84, the heater block 86E' (FIG. 7C) may have a smaller diameter of 3 inches. The shield 84' of wand 84' is a cylindrical structure, fitting over the outer periphery of the handle base portion 82B' of the handle 82'. As with the wand 80, a first heat insulator plate 86A' is attached to the flat surface of the base portion 82B' of the handle, and is connected by stainless steel standoffs to a second heat insulator plate 86C'. The plates 86A' and 86C' are fabricated of a heat insulating material. Heater block 86E' is supported by standoffs above the second heat insulator plate, and is fabricated of a heat conducting material, such as aluminum. In an exemplary embodiment, the heater block is 3.0 inches in diameter, and includes three chambers 86F' spaced about the outer periphery of the heater block in which three heater elements are received. Only one of the chambers 86F' is visible in FIG. 7C. The heater elements may be wired in series, for connection to the power module, although other wiring configurations may be employed. In other embodiments, a flattened heater element, e.g. a pancake-style heating element, may be employed, to further reduce the size of the wand.

FIGS. 9-12C illustrate another embodiment of a portable tube flaring system 50' for flaring flexible plastic tuber ends. The system 50' is similar to system 50 of FIG. 1, except that the wand 80' is fitted with a multi-chamber receptacle device 90'. This embodiment eliminates the need to change the heater receptacle device when flaring tubes of different sizes. The system includes a power/controller unit 60 as with the system 50, and the base 70' on which the unit 60 and mandrel set 100 are mounted and carried, respectively. The wand 80' is similar in structure and operation to wand 80 of the system 50 of FIG. 1, except that the heater receptacle device 90' includes a plurality, five in this example, receptacles or chambers 90A'-90E'.

In this exemplary embodiment, the individual receptacles are sized as ¼ inch diameter (90A'), ⅜ inch (90B'), ½ inch (90C'), ¾ inch (90D') and 1 inch (90E'), for use with corresponding mandrels 100A-100E. The largest receptacle is concentric with the center axis of the heater receptacle device 90', with the smallest two receptacles 90A' and 90B' disposed opposite each other and the next larger sized receptacles 90C' and 90D' disposed opposite each other and spaced from the other receptacles.

The receptacle device 90' is fabricated of a metal such as aluminum with high heat conductivity. The device 90' is installed into the wand 80' in intimate contact with a heater block, so that the receptacles are brought up to a desired operating temperature. The heating receptacles may be coated with a nickel-polymer coating, to help prevent the tube from sticking to the surface of the heater receptacles and may prevent the contamination of the tube end through oxidation of the aluminum. Other suitable coatings for a heating structure may alternatively be employed, for example Teflon or PTFE.

The multi-receptacle device 90' is attached to the heater block (as in the embodiment 50), e.g. by threaded fasteners in threaded bores 90-1'.

The operation of the system 50' is similar to that described above regarding the system 50, except that the user need not switch out the receptacle device if flaring tubing of any of the sizes compatible with the receptacles.

Although the foregoing has been a description and illustration of specific embodiments of the subject matter, various modifications and changes thereto can be made by persons skilled in the art without departing from the scope and spirit of the invention.

What is claimed is:

1. A portable tube flaring system for flaring a flexible plastic tube end, comprising:
    a hand-held wand with a heating element for heating a tube heater receptacle, configured to provide direct contact heating of the tube end about the entire outer periphery of the tube end, the tube heater receptacle defining a hollow cylindrical receptacle chamber of a diameter to match an outer diameter of the tube to be flared, and a depth defining a length of the tube end to be heated;

a mandrel device configured for manual insertion into the heated tube end by the user after the tube end is removed from the wand and heater receptacle; and a power/control unit connected to the wand by a wiring bundle to provide electrical power to the heating element, and to provide a visual and/or audio signal to the user for indicating when the tube end should be removed from the wand receptacle, and thereafter, when the mandrel may be removed from the tube end after sufficient cooling or curing time; and wherein the system does not employ a tube clamping mechanism for clamping the tube for insertion of the mandrel device.

2. The system of claim 1, further comprising:

a base structure;

wherein the power/control unit is attached to the base structure;

wherein the base structure further includes a mechanical device for releasably mounting the mandrel device to the base for storage; and wherein the wand, base structure, power/control unit and mandrel are configured in weight and size to be hand carried by a person.

3. The system of claim 1, wherein the mandrel device is one of a set of mandrel devices, each comprising a handle portion and a mandrel portion having a different diameter from the other mandrel devices for use with flaring tubes of a corresponding different inner diameter.

4. The system of claim 3, wherein the base structure further includes, for each mandrel device of the mandrel set, a mechanical device for releasably mounting the corresponding mandrel device to the base for storage.

5. The system of claim 4, wherein each mechanical device includes a post protruding from a surface of the base, and a hole or channel formed in the handle portion for receiving the post to mount the mandrel device to the base.

6. The system of claim 1, wherein the mandrel device includes a handle portion, a flare forming mandrel portion, and an outer shield attached to the handle to shield a user's body from the mandrel device and a hot tube end on the mandrel device.

7. The system of claim 1, wherein the tube heater receptacle is defined by a receptacle device configured for removable attachment to the wand.

8. The system of claim 7, further comprising:

a base structure;

wherein the power/control unit is attached to the base structure;

wherein the base structure further includes a mechanical device for releasably mounting the receptacle device to the base for storage; and wherein the wand, base structure, power/control unit, mandrel and receptacle device are configured in weight and size to be hand carried by a person.

9. The system of claim 1, wherein the tube heater receptacle is one of a plurality of tube heater receptacles, each receptacle having an inner diameter different from the diameters of another of said plurality of tube heater receptacles.

10. The system of claim 9, wherein each of the plurality of tube heater receptacles are defined by a multi-receptacle structure attached to the heater element, and configured for simultaneous heating by the heater element.

11. The system of claim 9, wherein each of the plurality of tube heater receptacles is defined by a separate heater receptacle device configured for removable attachment to the heater element of the wand.

12. The system of claim 11, further comprising:

a base structure;

wherein the power/control unit is attached to the base structure;

wherein the base structure further includes a mechanical device for releasably mounting each of the plurality of heater receptacle devices to the base for storage; and wherein the wand, base structure, power/control unit, mandrel and the plurality of heater receptacle devices are configured in weight and size to be hand carried by a person.

13. The system of claim 1, further comprising a temperature sensor at or adjacent the wand heater, and wherein the power/control unit monitors a temperature sensor signal indicative of the sensed temperature and is configured to maintain a wand heater temperature at a set temperature point.

14. A portable tube flaring system for flaring a flexible plastic tube end, comprising:

a hand-held wand with a heating element for heating a tube heater receptacle, configured to provide direct contact heating of the tube end about the entire outer periphery of the tube end when the tube end is inserted into the tube heater receptacle, the tube heater receptacle defining a hollow cylindrical receptacle chamber of a diameter to match an outer diameter of the tube to be flared, and a depth defining a length of the tube end to be heated;

said tube heater receptacle comprising one of a plurality of tube heater receptacles, each receptacle having an inner diameter different from the diameters of another of said plurality of tube heater receptacles;

a set of mandrel devices, each comprising a handle portion and a mandrel portion having a different diameter from the other mandrel devices for use with flaring tubes of a corresponding different inner diameter, each mandrel device configured for manual insertion into the heated tube end by the user after the tube end is removed from the wand and heater receptacle;

a power/control unit connected to the wand by a wiring bundle to provide electrical power to the heating element, and to provide a visual and/or audio signal to the user for indicating when the tube end should be removed from the wand receptacle, and thereafter, when the mandrel may be removed from the tube end after sufficient cooling or curing time; and a base structure;

wherein the power/control unit is attached to the base structure;

wherein the base structure further includes a mechanical device for releasably mounting each of the set of mandrel devices to the base for storage;

wherein the wand, base structure, power/control unit, set of mandrels and said plurality of tube heater receptacles are configured in weight and size to be hand carried by a person; and wherein the system does not employ a tube clamping mechanism for clamping the tube for insertion of the mandrel device.

15. The system of claim 14, wherein the base structure further includes, for each mandrel device of the mandrel set, a mechanical device for releasably mounting the corresponding mandrel device to the base for storage.

16. The system of claim 14, wherein each of the plurality of tube heater receptacles are defined by a multi-receptacle structure attached to the heater element, and configured for simultaneous heating by the heater element.

17. The system of claim 14, wherein each of the plurality of tube heater receptacles is defined by a separate heater receptacle device configured for removable attachment to the heater element of the wand.

18. The system of claim 14, further comprising a temperature sensor at or adjacent the wand heater, and wherein the power/control unit monitors a temperature sensor signal indicative of the sensed temperature and is configured to maintain a wand heater temperature at a set temperature point.

* * * * *